United States Patent [19]
Bland

[11] Patent Number: 6,091,403
[45] Date of Patent: Jul. 18, 2000

[54] COMPUTER INTERFACE

[75] Inventor: Brine Bland, Darlinghurst, Australia

[73] Assignee: Ego Works Pty. Ltd., New South Wales, Australia

[21] Appl. No.: 08/737,638

[22] PCT Filed: May 17, 1994

[86] PCT No.: PCT/AU94/00256

§ 371 Date: Feb. 26, 1997

§ 102(e) Date: Feb. 26, 1997

[87] PCT Pub. No.: WO94/27207

PCT Pub. Date: Nov. 24, 1994

[30] Foreign Application Priority Data

May 18, 1993 [AU] Australia ............................. PL 8860

[51] Int. Cl.[7] ............................................... G09G 5/08
[52] U.S. Cl. ............................................ 345/163; 345/157
[58] Field of Search ..................... 345/156, 157, 345/163, 164, 165, 166, 167; 248/118, 118.1, 118.3, 118.5; 273/148 B

[56] References Cited

U.S. PATENT DOCUMENTS

| 4,862,165 | 8/1989 | Gart ........................................ 345/163 |
|---|---|---|
| 4,917,516 | 4/1990 | Retter ...................................... 345/163 |
| 5,234,186 | 8/1993 | Powell ................................... 248/118.1 |
| 5,252,970 | 10/1993 | Baronowsky ............................ 345/164 |
| 5,287,090 | 2/1994 | Grant ...................................... 345/163 |
| 5,340,067 | 8/1994 | Martin et al. ....................... 273/148 B |
| 5,570,112 | 10/1996 | Robinson ................................ 345/163 |
| 5,726,683 | 3/1998 | Goldstein et al. . | |

FOREIGN PATENT DOCUMENTS

| 0 453 587 | 10/1991 | European Pat. Off. . |
|---|---|---|
| 0 591 960 | 4/1994 | European Pat. Off. . |
| 92 16 634 | 2/1993 | Germany . |
| 93 12 224 | 10/1993 | Germany . |

*Primary Examiner*—Matthew Luu
*Attorney, Agent, or Firm*—Stevens, Davis, Miller & Mosher, L.L.P.

[57] ABSTRACT

A computer interface mouse characterized in that it has a first portion adapted in use to support a user's hand and a second portion adapted in use to receive a user's thumb in a generally neutral position. The first portion includes a first surface which extends generally at an upward angle relative to a base surface of the computer interface and which first surface, in use, supports the user's downwardly facing palm and four fingers in a relaxed neutral position.

7 Claims, 7 Drawing Sheets

COMPUTER INTERFACE

The present invention relates to a computer interface and in particular to a computer interface of the type known as a "mouse".

As is now well known to the general public, a "mouse" is a computer interface which is of use for moving a cursor on a computer screen. The "mouse" comprises some form of relative movement detecting means adapted to detect movement of the "mouse" relative to a surface with which it is in contact. This relative movement is converted to an electrical signal which may be transmitted to the computer via a cable, radio transmission or by optical signal transmission. The received signal is then used to produce a corresponding movement of the cursor on the computer screen. A "mouse" is of generally rectangular shape having rounded edges and typically includes one or more microswitches which can be finger actuated, for example to signal selection of a specific command displayed on the computer screen. Usually the "mouse" is moved to a position on the screen where the desired command is displayed and a microswitch is then "clicked" to select the command.

In use, a typical "mouse" is grasped at the side edges between the thumb and the third and fourth finger. The rear edge of the mouse abuts the rear of the palm and the second and third fingers are used to operate microswitches adjacent the front edge.

Prolonged use of a mouse can lead to muscle fatigue and continuous long term use of a "mouse" can potentially lead to the physiological problems associated with other manipulative tasks such as typing. In particular, Occupational Overuse Syndrome (OOS), also known as Repetitive Stress Injury (RSI), has been of great concern over recent years. OOS is a term that incorporates a whole range of muscular skeletal disorders such as tendonitus, tenosynovitus, and carpel tunnel syndrome. It is generally believed that OOS is a result of restricted blood flow to the major areas of work load; in particular the wrists, forearms and intricate muscle areas around the elbows. Lactic acid and other waste products that are released in varying quantities by all muscle usage are unable to be flushed away if the affected muscles are too tense.

Taking regular breaks to enable these muscles to relax and consequently allow blood to flow freely lessens the build up of lactic acid and other waste products. Various relaxation exercises are recommended such as letting the arms hang loosely from the shoulders and shaking the wrists like a rag-doll. However, too frequently computer operators do not follow these recommendations and consequently, excessive muscle fatigue often occurs. Habitual muscle tension results and the long term consequence of this is OOS.

It is an object of the invention to provide a computer interface which avoids or minimises the risk of OOS to a user.

According to the invention there is provided a computer interface "mouse" characterised in that it comprises a first portion adapted in use to support a user's hand and a second portion adapted in use to receive the user's thumb in a generally neutral position.

Preferably, said first portion includes a first surface which extends generally at an upward angle relative to a base surface of the computer interface and which first surface, in use, supports the user's downwardly facing palm and four fingers in a relaxed neutral position. More preferably, the first surface is convex and the first surface includes a ridge line which extends at a generally upward angle relative to the base surface. Preferably, the ridge line includes a concave portion defining a saddle, a notional chord intersecting the saddle at a generally upward angle relative to the base surface. Most preferably, the first portion includes microswitches positioned adjacent the users fingertips when the palm is so supported, the microswitches being positioned for use by fingers in the extended relaxed neutral position.

Preferably also, the second portion includes a concave surface adapted to receive the user's thumb in the generally neutral position. In preferred embodiments, the concave surface defines a groove.

A preferred embodiment of the invention will now be described by way of example only, with reference to the accompanying drawings and example in which.

Figure 1:
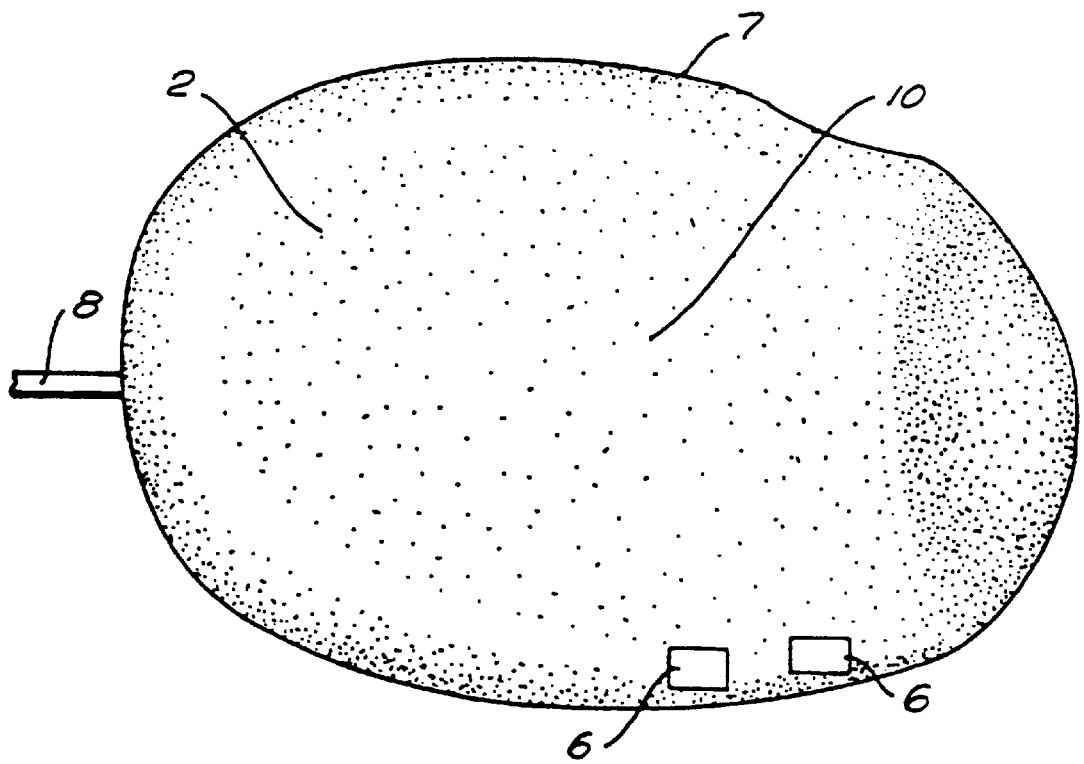
FIG. 1 is a plan view of a computer interface according to the invention.

Referring to the drawings, there is shown a computer interface "mouse" 2 adapted to be supported on a generally horizontal surface (not shown) and having a generally flat base surface 1. "Mouse" 2 includes relative movement detecting means 4 (not shown in FIGS. 7 to 14) adapted to detect movement of the "mouse" 2 relative to a surface which supports it and to provide signals indicative of the direction and extent of relative movement via cable 8. Such means are well known in the art. The movement detecting means 4 is conventional and any suitable transducer may be employed. "Mouse" 2 further includes microswitches 6 adapted to be manually actuated to send signals via cable 8 to the computer.

"Mouse" 2 defines a first surface 10 which in use is the upper surface and is adapted to support a user's hand and a second portion 12, which is a groove, adapted in use to receive the user's thumb in a generally neutral position.

Figure 2:
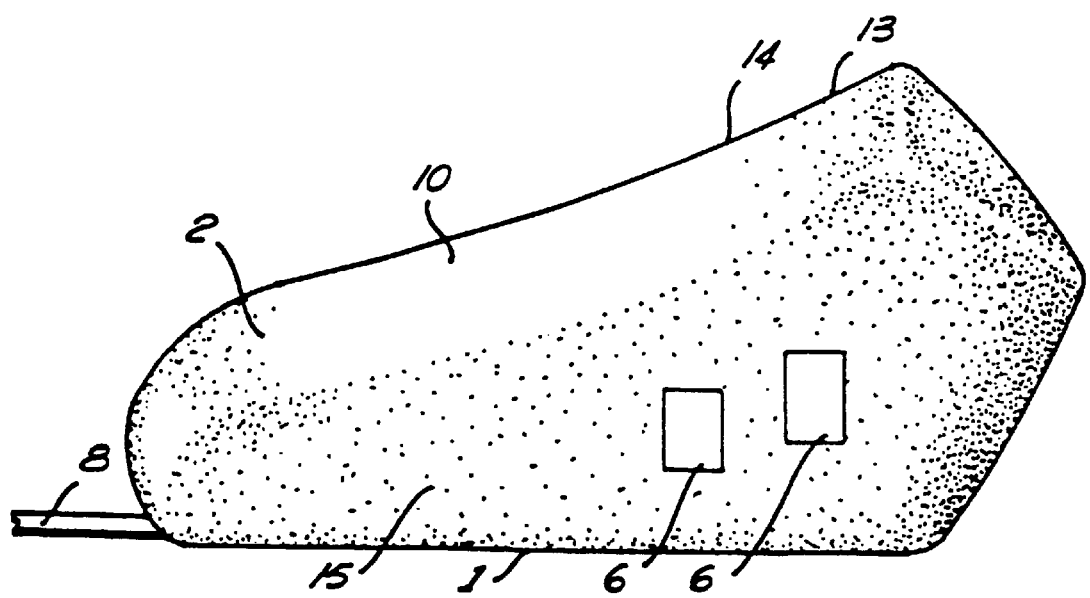
FIG. 2 is a front elevation view of the computer interface of FIG. 1.
Figure 3:
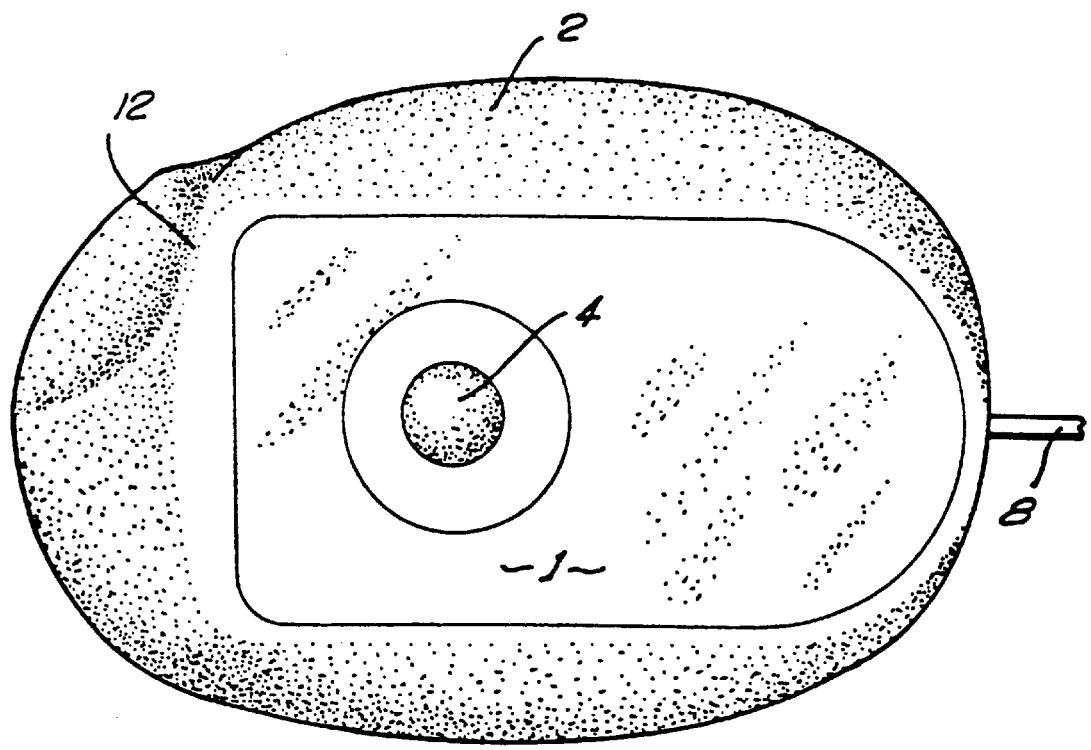
FIG. 3 is an underside plan view of the computer interface of FIG. 1.

The shape of computer interface 2 will be best appreciated with reference to FIGS. 4, 8, 11 and 12. As can be seen from the drawings, the first surface is convex and includes a ridge line 13 which extends generally upwardly relative to the base. The ridge line further defines a saddle line 14. It can be seen in FIG. 12 that the angle relative to the base of the notional chord intersecting the saddle line is about 18 to 200°. Typically, angles of 150° to 250° would be used. The first surface merges with side surfaces 15, and microswitches can be positioned either on this side surface (see FIG. 2) or on both the side surface and the first convex surface (see FIG. 7).

Figure 7:
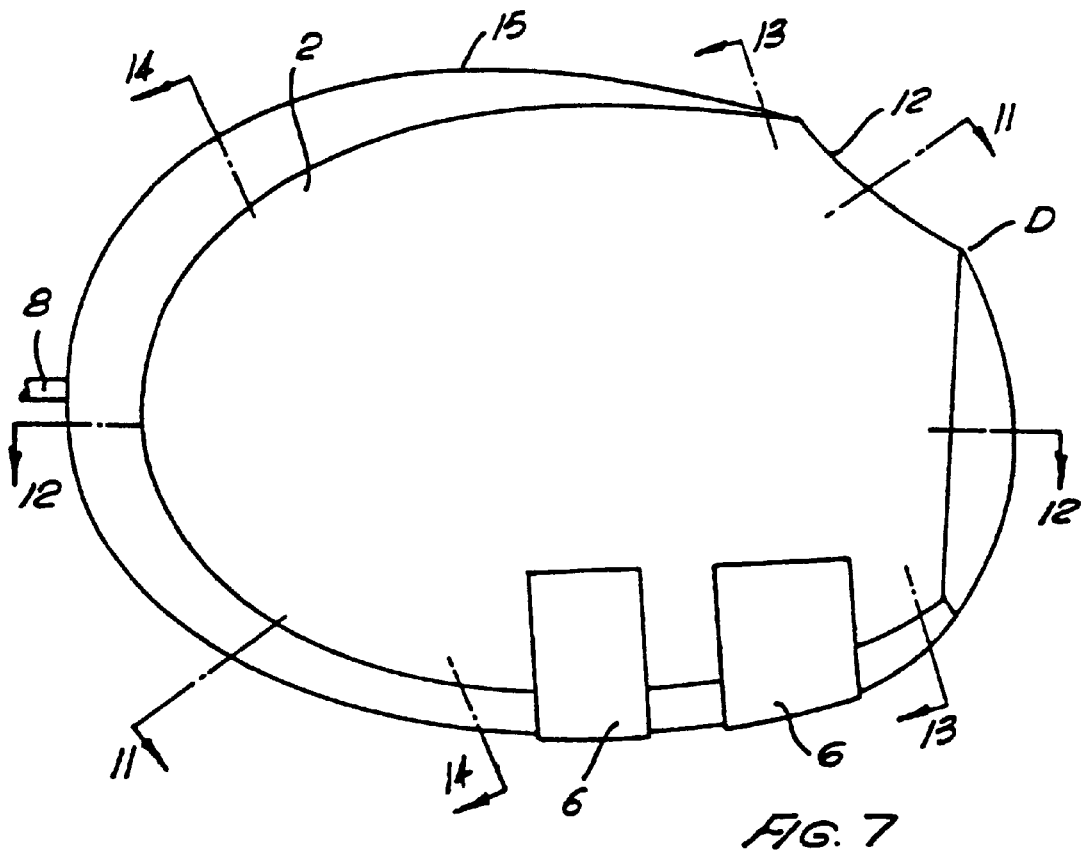
FIG. 7 is a top view of a computer interface in accordance with another embodiment of the invention.
Figure 8:
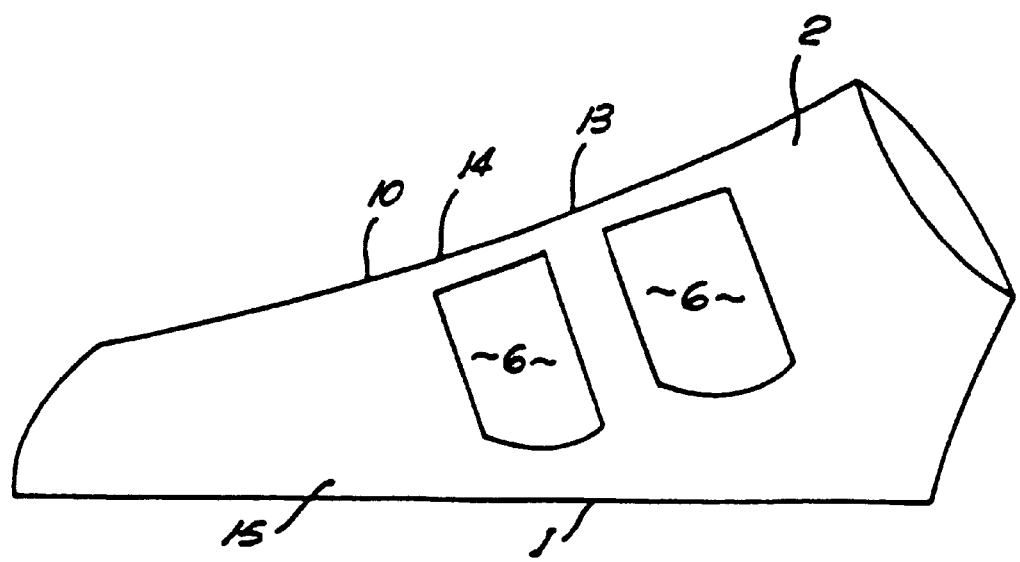
FIG. 8 is a side elevation view of the computer interface of FIG. 7.
Figure 9:
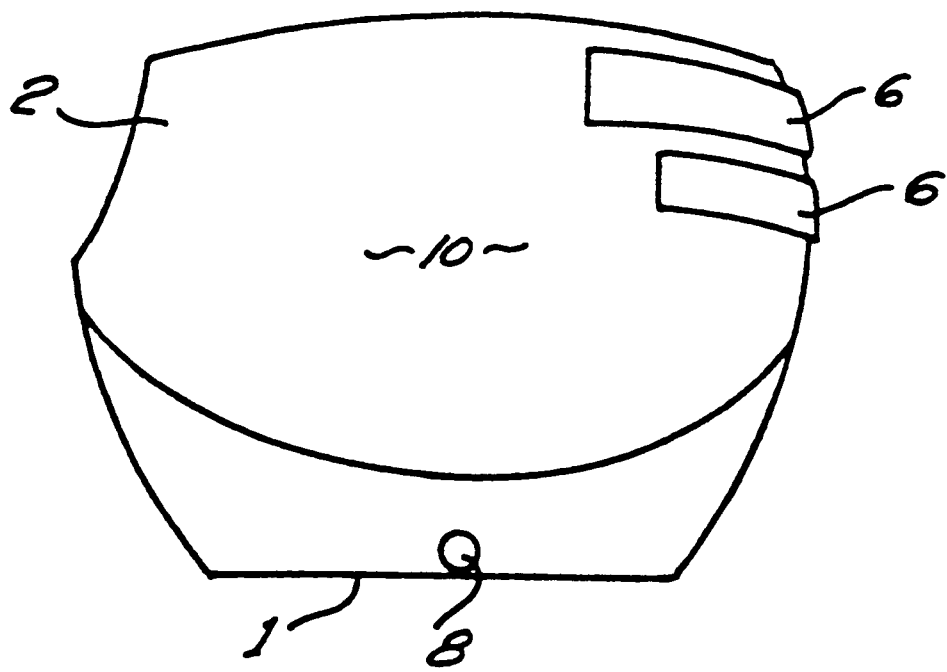
FIG. 9 is an end elevation view of the computer interface of FIG. 7.
Figure 10:
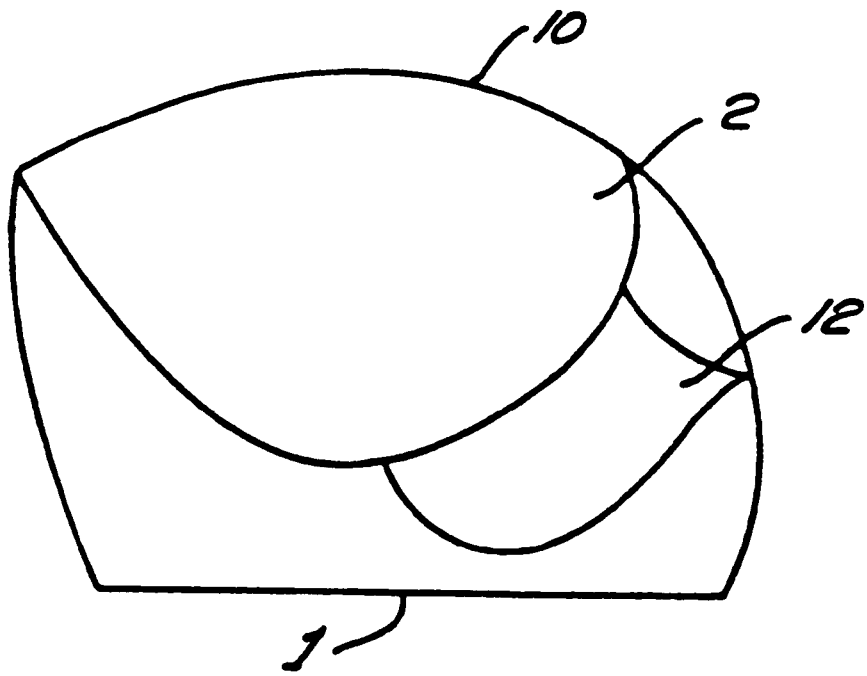
FIG. 10 is the other end elevation view of the computer interface of FIG. 7.
Figure 11:
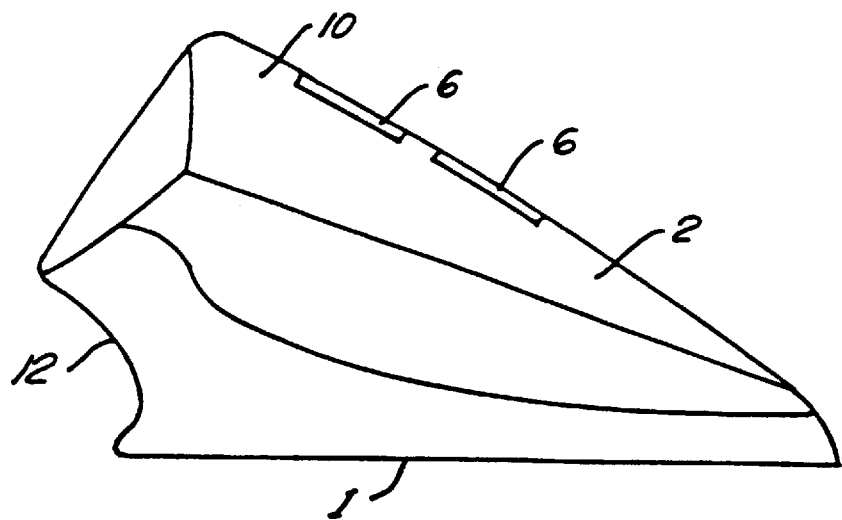
FIG. 11 is a sectional view of the computer interface of FIG. 7 taken along the line 11—11.
Figure 12:
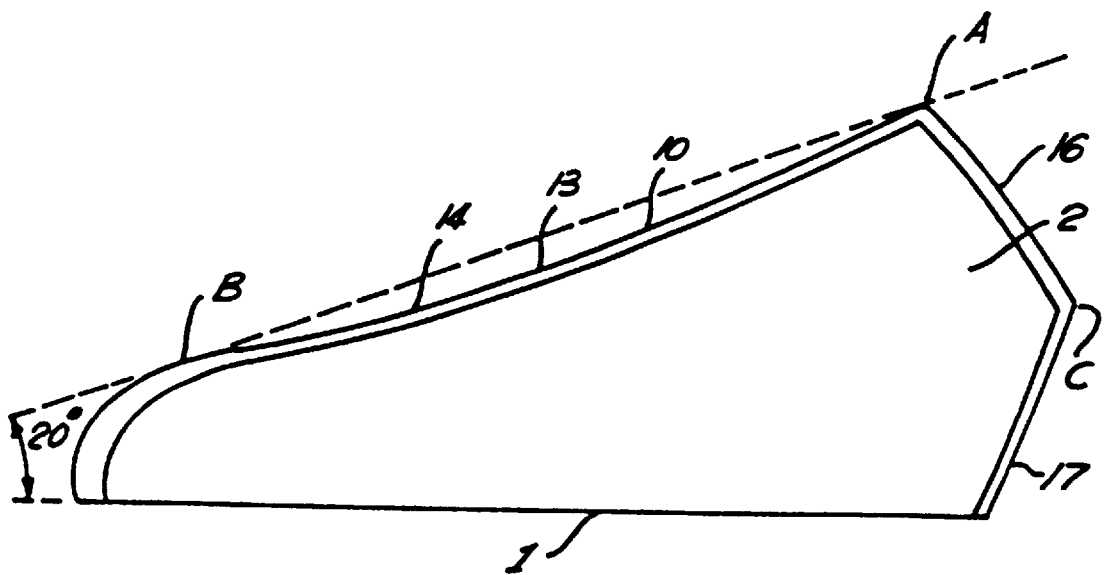
FIG. 12 is a sectional view of the computer interface of FIG. 7 taken along the line 12—12.
Figure 13:
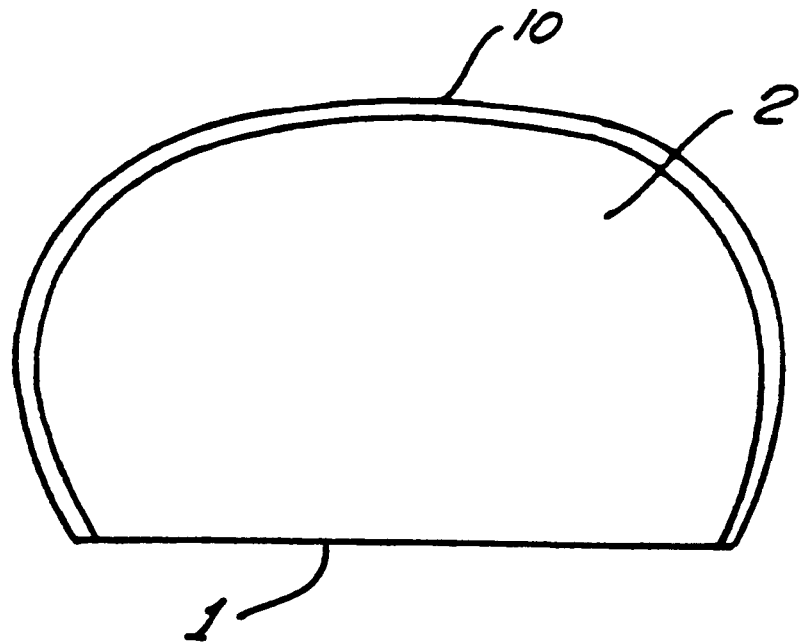
FIG. 13 is a sectional view of the computer interface of FIG. 7 taken along the line 13—13.
Figure 14:
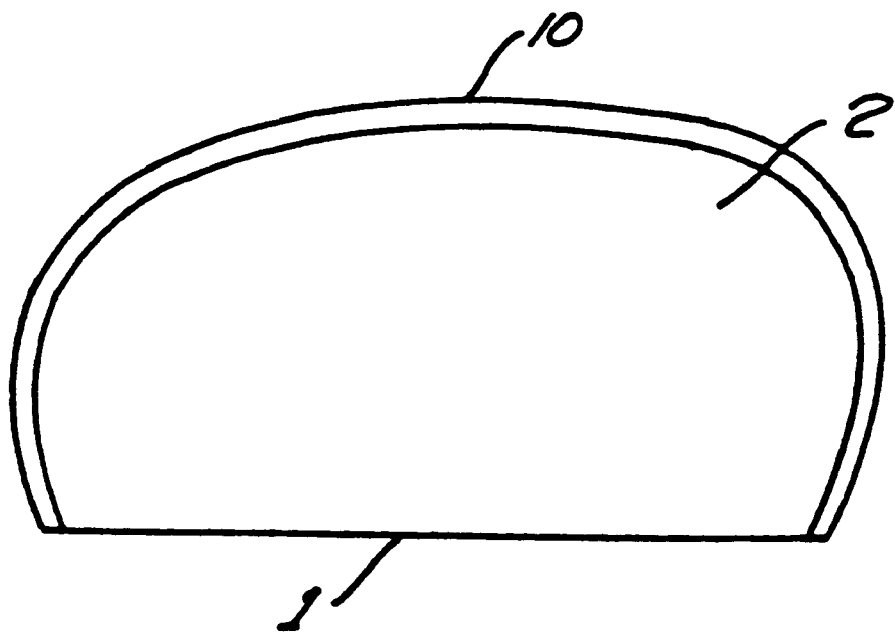
FIG. 14 is a sectional view of the complete interface of FIG. 7 taken along the line 14—14.

Referring to FIG. 12, the mouse at its maximum height above the base (point A), preferably has a height relative to the base surface in the range of 50 to 60 mm, typically about 53 to 54 mm. As shown in the drawings, this maximum height is typically at the point at which the notional chord intersects the highest point of the saddle line. The notional chord typically intersects the lower maximum point of the saddle line, point B, at a height of the order of 18 to 20 mm. As can also be seen, the first surface 10 terminates in a forwardly downwardly leading edge 16 which joins at point C with a backwardly downward leading edge 17 of the side surface 15. The height of this point C relative to the base surface is of the order of 23 to 27 mm, more typically 25 to 26 mm. Referring to FIG. 7, the computer interface typically has a length along the line 12—12 of the order of 110 to 125 mm, more typically 116 to 119 mm, and a width along the line 13—13 of the order of 85 to 95 mm, more typically 88 to 90 mm. Point D of the groove 12 is located 18–20 mm inwardly of the outermost dimension of side wall 15 and the groove 12 is sufficiently long to accommodate a thumb. The maximum length of the saddle line is typically of the order of 90 to 105 mm more typically 98 to 99 mm.

Figure 4:
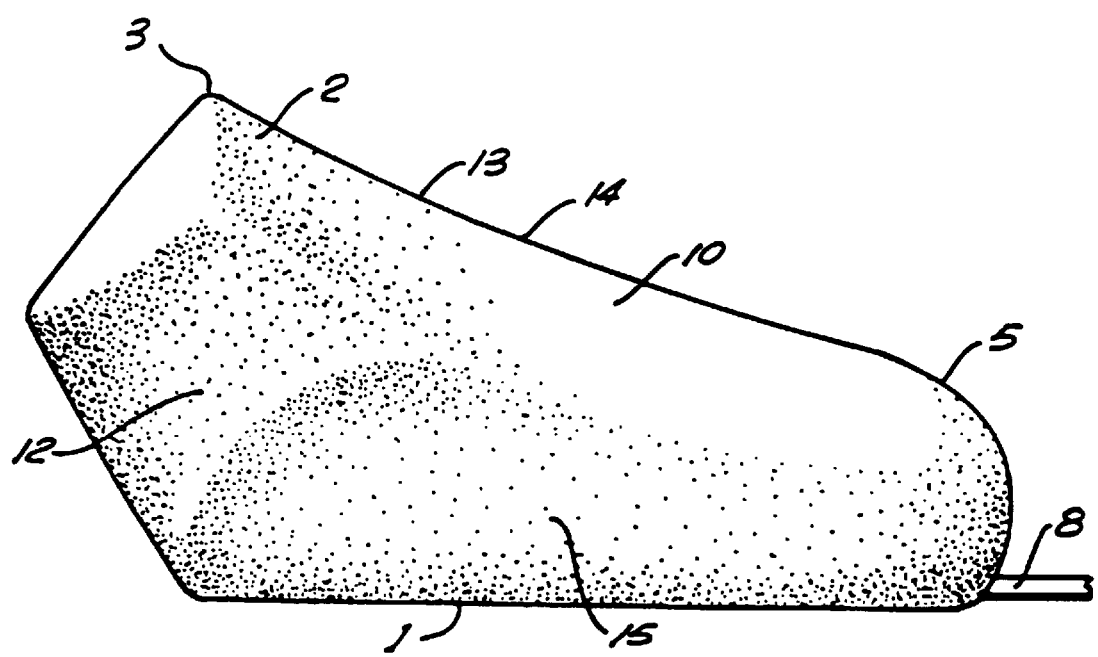
FIG. 4 is a rear elevation view of the computer interface of FIG. 1.
Figure 5:
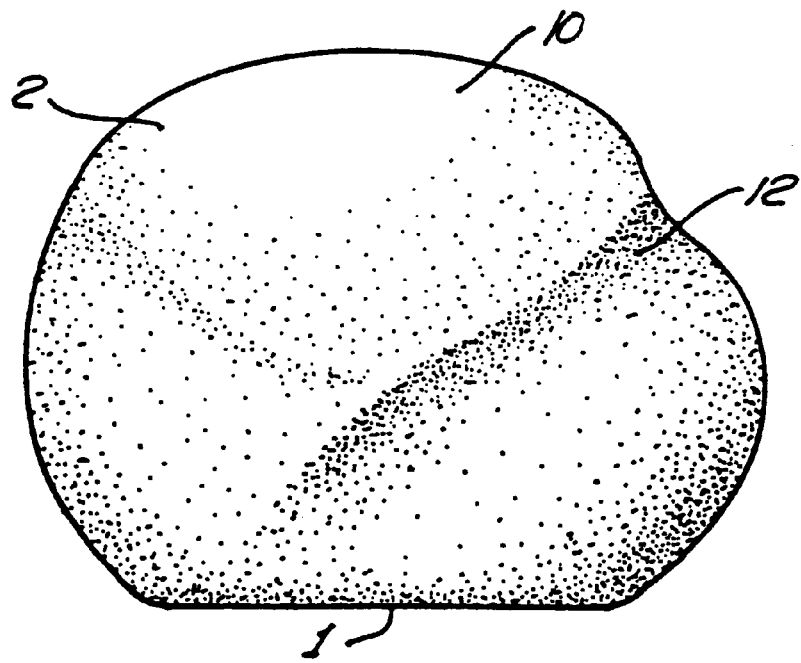
FIG. 5 is an end elevation view of the computer interface of FIG. 1.
Figure 6:
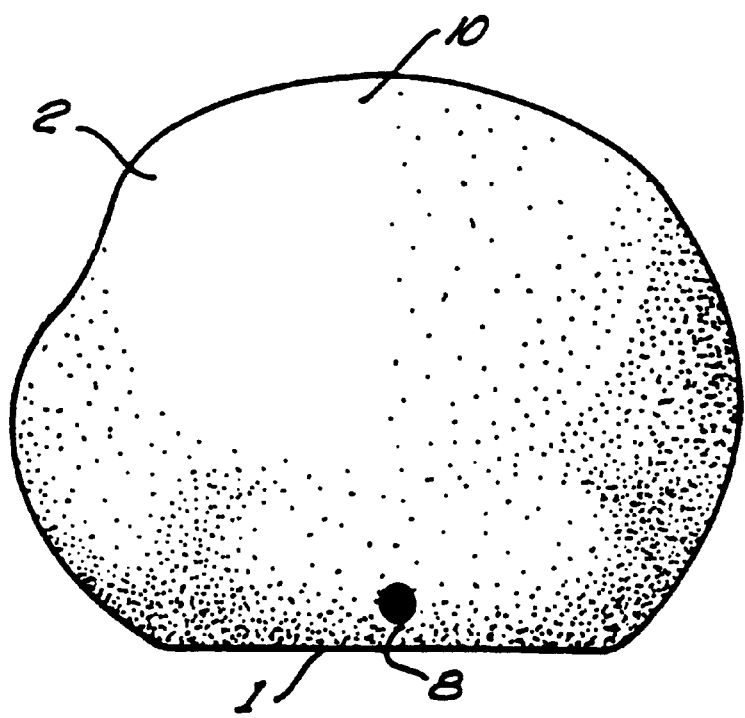
FIG. 6 is the other end elevation view of the computer interface of FIG. 1.

Referring to FIG. 4, it will be appreciated that the embodiments illustrated are designed to be used by the right hand of the user. The relaxed hand is placed over first portion 10 which is convex to the extent that it is comfortably cupped by the palm and relaxed extended fingers of the user. The longitudinal extent of surface 10 from edge 3 to edge 5 is sufficient to accommodate and support four fingers. The thumb of the user extends downwardly and to the left as viewed in FIG. 4 to second portion 12. The end result of this is that the hand is in a relaxed neutral position with no, or minimal muscle tension. The first and second fingers of the hand extend from wrist side 7 over the first portion 10 of computer interface 2 and terminate adjacent to microswitches 6. Microswitches 6 can thus be conveniently actuated by minimal movement of the finger tips. The fingers are supported by surface 10 in a relaxed extended position.

Preferred embodiments of the present invention enable the users hand to be maintained and supported in a neutral position. The "neutral" anatomical position on a downwardly facing relaxed hand is such that the hand is open, the fingers are slightly curled downwardly, the palm is slightly cupped, and the thumb is below the level of the palm and spaced from the fingers and forms a generally opposed open grid with the fingers.

Whereas in the prior art the thumb and fourth or fifth finger are opposed, the "mouse" of the present invention can be used with the thumb in a neutral position i.e. relaxed and supported in support groove 12 and the fourth and fifth fingers are relaxed and supported on surface 10. The crook between the thumb and first finger, together with the fingertips is used to drive the "mouse" so that is shape and method of use is radically different from the prior art. In preferred embodiments the thumb is neutral both in respect of a horizontal and vertical plane of movement.

In the preferred embodiment illustrated, the various top, side, and end surfaces blend into one another. It will be appreciated from the teaching herein that the invention may be embodied in other forms. For example, a suitably shaped thumb hole could be provided instead of groove 12.

The upper surface may be provided with ridges adjacent either edge 3 or 5, so as to further prevent hand movement relative to upper surface 10.

EXAMPLE

A computer interface made in accordance with the present invention was compared to two conventional computer interfaces made respectively by Microsoft® and Apples®, in which the upper surfaces extend generally parallel to the base apart from curvature at the edges. 50 individuals were tested. EMG's of the energy use of the extensor muscle was obtained at a rate of 5 readings/second whilst each individual moved the various interfaces in a set pattern for a period of 20 seconds. It was found that the mean extensor muscle energy usage of the computer interface made in accordance with the present invention was 20% lower than the computer interface made by Microsoft and 28% lower than the computer interface made by Apple.

Those skilled in the art would appreciate that a mouse according to the invention could be designed for use with the left hand.

Although the invention has been described with reference to specific examples, it will be appreciated by those skilled in the art that the invention may be embodied in many other forms.

What is claimed is:

1. A computer interface mouse comprising:
   a first support portion adapted in use to support a user's hand; a second support portion adapted in use to receive and support the user's thumb in a generally neutral position; a left-most point; a right-most point; and a first notional chord at an angle to a horizontal plane on which the mouse is operated, which runs a length of the mouse between the left-most point and the right-most point; such that in use of the mouse the user's thumb lies on one side of the first notional chord and the user's four fingers lie on the other side of the first notional chord, and the user's wrist is rotated about the longitudinal axis of the user's arm to a neutral rotation of the palm relative to the horizontal plane such that the hand is supported substantially at said angle to the pronated position with respect to the horizontal plane.

2. A computer interface mouse according to claim 1, wherein said first support portion includes a first surface which extends generally at an upward angle relative to a base surface of the computer interface and which surface, in use, supports the user's downwardly facing palm and four fingers in a relaxed neutral position.

3. A computer interface mouse according to claim 2, wherein the first surface includes a ridge line which extends at a generally upward angle relative to the base surface, the first surface being convex about the ridge line.

4. A computer interface mouse according to claim 3, wherein the ridge line includes a concave portion defining a saddle, the notional chord intersecting the saddle at a generally upward angle relative to the base surface.

5. A computer interface mouse according to claim 1, wherein the first support portion includes microswitches positioned adjacent the user's fingertips when the palm is so supported, the microswitches being positioned for use by fingers in the extended relaxed neutral positions.

6. A computer interface mouse according to claim 2, wherein the first support portion includes microswitches positioned adjacent the user's fingertips when the palm is so supported, the microswitches being positioned for use by fingers in the extended relaxed neutral positions.

7. A computer interface mouse comprising a first support portion adapted in use to support a user's hand, a second support portion adapted in use to receive and support the user's thumb in a generally neutral position, a longitudinal axis, a left-most point, a right-most point, and a first notional chord at an elevated angle to a horizontal plane on which the mouse operates and which notional chord runs a length of the mouse between the left-most point and the right-most point, such that during use of the mouse the user's thumb lies on one side of the first notional chord and the user's four fingers lie on the other side of the first notional chord, wherein during normal operation of the mouse the longitudinal axis of the arm is at an angle with respect to the longitudinal axis of the mouse.

* * * * *